(12) United States Patent
Albanese et al.

(10) Patent No.: US 7,597,762 B2
(45) Date of Patent: Oct. 6, 2009

(54) METHODS AND APPARATUS FOR MANUFACTURING COMPONENTS

(75) Inventors: Joseph G. Albanese, Rotterdam Jct., NY (US); Robert Scott Shalvoy, Scotia, NY (US); Jon E. Dickinson, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 724 days.

(21) Appl. No.: 11/231,499

(22) Filed: Sep. 21, 2005

(65) Prior Publication Data

US 2007/0062018 A1   Mar. 22, 2007

(51) Int. Cl.
B05C 21/00 (2006.01)
B23P 25/00 (2006.01)

(52) U.S. Cl. .................. 118/500; 118/720; 118/730; 118/506; 29/559

(58) Field of Classification Search .............. 118/500, 118/503, 506, 720, 729, 730; 269/71; 29/559
See application file for complete search history.

(56) References Cited

U.S. PATENT DOCUMENTS

| | | | |
|---|---|---|---|
| 3,124,986 A | 3/1964 | Bader et al. | |
| 3,726,162 A | 4/1973 | Sato | |
| 3,890,057 A | 6/1975 | Kindelan | |
| 3,993,297 A * | 11/1976 | Tokunaga | 269/54.5 |
| 4,271,005 A * | 6/1981 | Wright et al. | 204/298.15 |
| 5,216,808 A | 6/1993 | Martus et al. | |
| 5,565,035 A | 10/1996 | Sylvestro et al. | |
| 5,618,353 A | 4/1997 | Irvine et al. | |
| 5,630,879 A * | 5/1997 | Eichmann et al. | 118/720 |
| 5,792,267 A * | 8/1998 | Marszal et al. | 118/500 |
| 5,849,359 A * | 12/1998 | Burns et al. | 427/242 |
| 5,972,424 A | 10/1999 | Draghi et al. | |
| 6,042,880 A | 3/2000 | Rigney et al. | |
| 6,083,322 A * | 7/2000 | Burns et al. | 118/730 |
| 6,502,304 B2 | 1/2003 | Rigney et al. | |
| 6,532,656 B1 | 3/2003 | Wilkins et al. | |
| 6,606,541 B2 | 8/2003 | Vaidyanathan | |
| 6,632,070 B1 | 10/2003 | Tiemann | |
| 7,178,254 B2 | 2/2007 | Couture | |

FOREIGN PATENT DOCUMENTS

FR   2074300   1/1971

OTHER PUBLICATIONS

EP Search Report, App. No. 06254842.5 (Jan. 4, 2007).

* cited by examiner

*Primary Examiner*—Essama Omgba
(74) *Attorney, Agent, or Firm*—Armstrong Teasdale LLP

(57) ABSTRACT

A method for manufacturing components is provided. The method includes coupling a drive assembly to a positioning assembly, coupling a plurality of components to be manufactured to a plurality of fixtures, securing the plurality of fixtures to the drive assembly wherein each fixture is configured to receive a component to be manufactured, and repositioning the plurality of components simultaneously using the positioning assembly to facilitate manufacturing of the plurality of components, wherein the components are configured to be oscillated in a first plane of rotation via the drive assembly and rotated through a second plane of rotation via the plurality of fixtures.

15 Claims, 6 Drawing Sheets

METHODS AND APPARATUS FOR MANUFACTURING COMPONENTS

BACKGROUND OF THE INVENTION

The present invention relates generally to manufacturing components, and more specifically to methods and apparatus for aligning, supporting, and/or securing components for manufacture.

Accurate manufacturing of gas turbine engine components may be a significant factor in determining both manufacturing timing and cost. Specifically, when the component is a gas turbine engine blade, accurate manufacturing of the blade may be a significant factor affecting an overall cost of fabrication of the gas turbine engine, as well as subsequent modifications, repairs, and inspections of the blade. For example, at least some known gas turbine engine blades receive a protective coating to facilitate protection of the turbine blades when the blades are subjected to high velocity fluid flows in a high temperature environment. Accurately coating the turbine blades facilitates enhancing a useful life of the blades.

To align a turbine blade for spray coating, known systems enable a single blade to be coupled to a positioning system to enable a spray coating to be applied to the blade. At least some known positioning systems require the blades be repositioned several times through a variety of orientations to enable the coating to be applied at the desired thickness across each portion of the blade to be coated. The process is then repeated for each blade requiring a coating. As such, applying a coating to a component using known systems may be a time consuming process that increases engine manufacturing cycle times and fabrication costs.

BRIEF DESCRIPTION OF THE INVENTION

In one aspect, a method for manufacturing components is provided. The method includes coupling a drive assembly to a positioning assembly, coupling a plurality of components to be manufactured to a plurality of fixtures, securing the plurality of fixtures to the drive assembly wherein each fixture is configured to receive a component to be manufactured, and repositioning the plurality of components simultaneously using the positioning assembly to facilitate manufacturing of the plurality of components, wherein the components are configured to be oscillated in a first plane of rotation via the drive assembly and rotated through a second plane of rotation via the plurality of fixtures.

In another aspect, a fixture assembly for use in manufacturing a plurality of components is provided. The fixture assembly includes at least two fixtures configured to support the plurality of components being manufactured, a drive assembly, the at least two fixtures coupled to the drive assembly and rotatable along a first axis of rotation, the drive assembly comprises a plurality of spindles extending outward therefrom and a plurality of platens coupled to the spindles, the plurality of spindles and the plurality of platens configured to oscillate in a second plane of rotation that is orthogonal to the first axis of rotation.

In a further aspect, a coating system is provided. The coating system includes a drive assembly, a fixture assembly comprising at least two fixtures coupled to the drive assembly, and a positioning assembly coupled to the fixture assembly, the drive assembly comprises a plurality of spindles extending outward therefrom and a plurality of platens coupled to the spindles, the plurality of spindles and the plurality of platens configured to oscillate in a second plane of rotation that is orthogonal to the first axis of rotation.

DETAILED DESCRIPTION OF THE INVENTION

Figure 1:
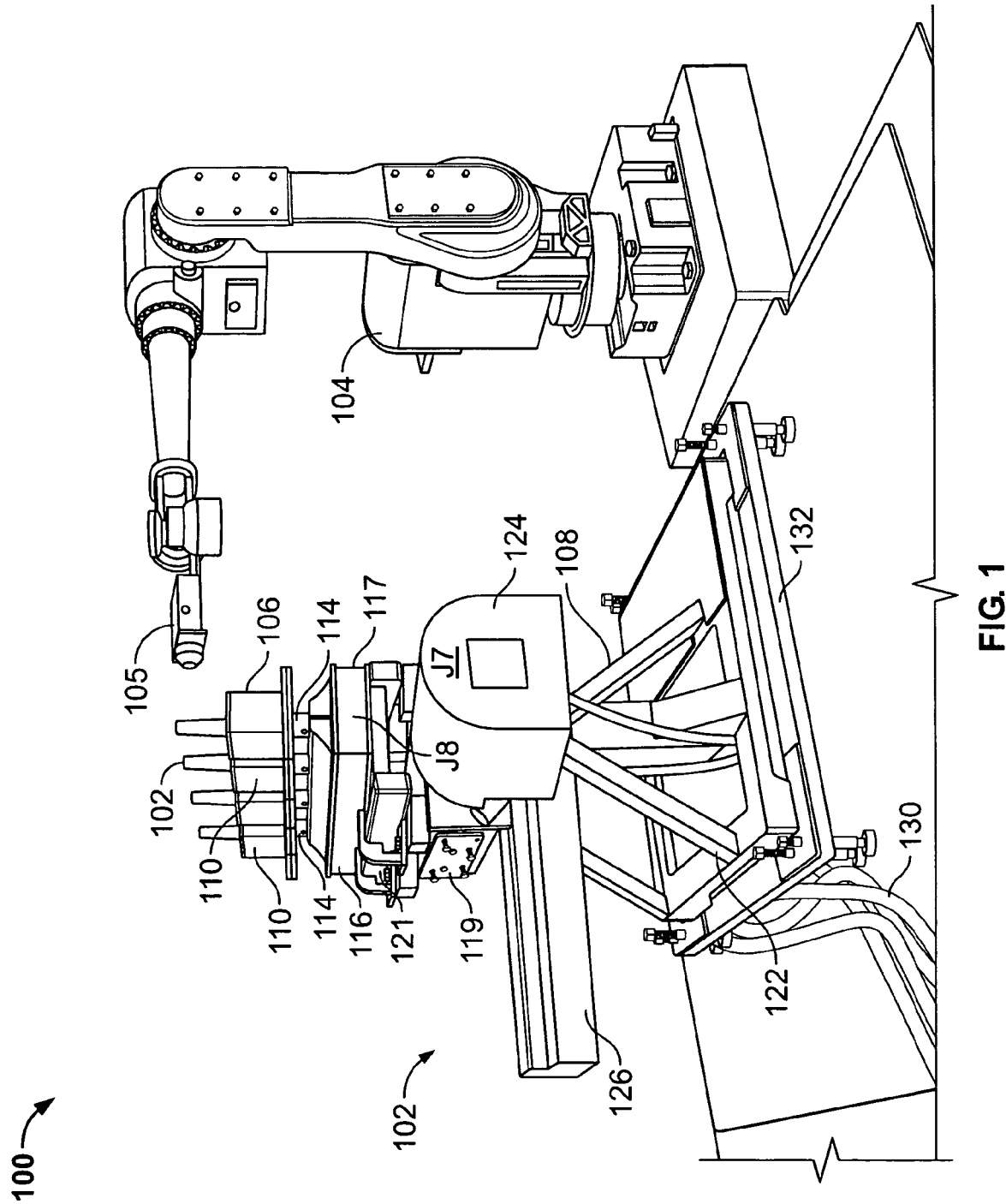
FIG. 1 is a perspective view of an exemplary component spray coating system including a component manufacturing assembly.

FIG. 1 is a perspective view of an exemplary embodiment of a component spray coating system 100 in a first position. In the exemplary embodiment, system 100 is used to spray turbine blades 112. System 100 includes a coating applicator 104 having a spray nozzle 105, a component manufacturing apparatus 102 that includes a fixture assembly 106, and a positioning and coating control system (not shown on FIG. 1). In FIG. 1 fixture assembly 106 is rotated towards coating applicator 104 and is coupled to a positioning assembly 108.

Fixture assembly 106 includes a plurality of fixtures 110 used to secure the components. More specifically, in the exemplary embodiment, assembly 106 includes four fixtures 110 which enable four turbine blades 112 to be coated simultaneously as described in more detail below. In an alternative embodiment, assembly 106 includes any number of a plurality of fixtures 110. Turbine blades 112 are shown for illustrative purposes only and fixture assembly 106 is not limited to only being used in the manufacture of blades 112. Fixture 110 is securely coupled to a respective one of a plurality of platens 114. The exemplary embodiment includes four platens 114 that each cooperate with a respective fixture 110. Platens 114 are each coupled to a drive assembly 116.

Drive assembly 116 includes an enclosure 117 that contains a plurality of drive gears (not shown in FIG. 1) coupled to a plurality of spindles (not shown in FIG. 1) and platens 114. Spindles (not shown in FIG. 1) extend outwardly from assembly 116, and the plurality of drive gears are sized, positioned, and aligned to enable each spindle and platen 114 rotate at substantially the same rate. Drive assembly 116 includes a mounting frame 119 and a plurality of lifting slots 121 that are formed integrally with mounting frame 119. The arrows labeled J8 on FIG. 1 illustrate a plane of rotation and a direction of rotation of platens 114. Drive assembly 116 also houses a plurality of upper bearings (not shown in FIG. 1), a plurality of platen-to-spindle biased couplings (not shown in FIG. 1), a plurality of collars (not shown in FIG. 1), a main drive gear (not shown in FIG. 1), a plurality of platen drive gears (not shown in FIG. 1), a plurality of inter-platen drive gears (not shown in FIG. 1), a main drive gear drive shaft (not shown in FIG. 1), and a plurality of lower bearings (not shown in FIG. 1).

In the exemplary embodiment, positioning assembly 108 is a turntable that has been modified and that includes a plurality of floor supports 122, a tilt drive electric motor 124, a tilt drive shaft and support bearing (not shown in FIG. 1), a platen drive motor 126, a platen drive translational gear 128, a plurality of electric power cables 130, and a raised floor stand 132.

Assembly 108 also includes a platen drive shaft-to-main drive gear drive shaft coupling (not shown in FIG. 1) through which assembly 108 powers drive assembly 116. In FIG. 1, the arrows labeled J7 illustrate a tilt plane of rotation and a direction of rotation of assembly 106.

Figure 2:
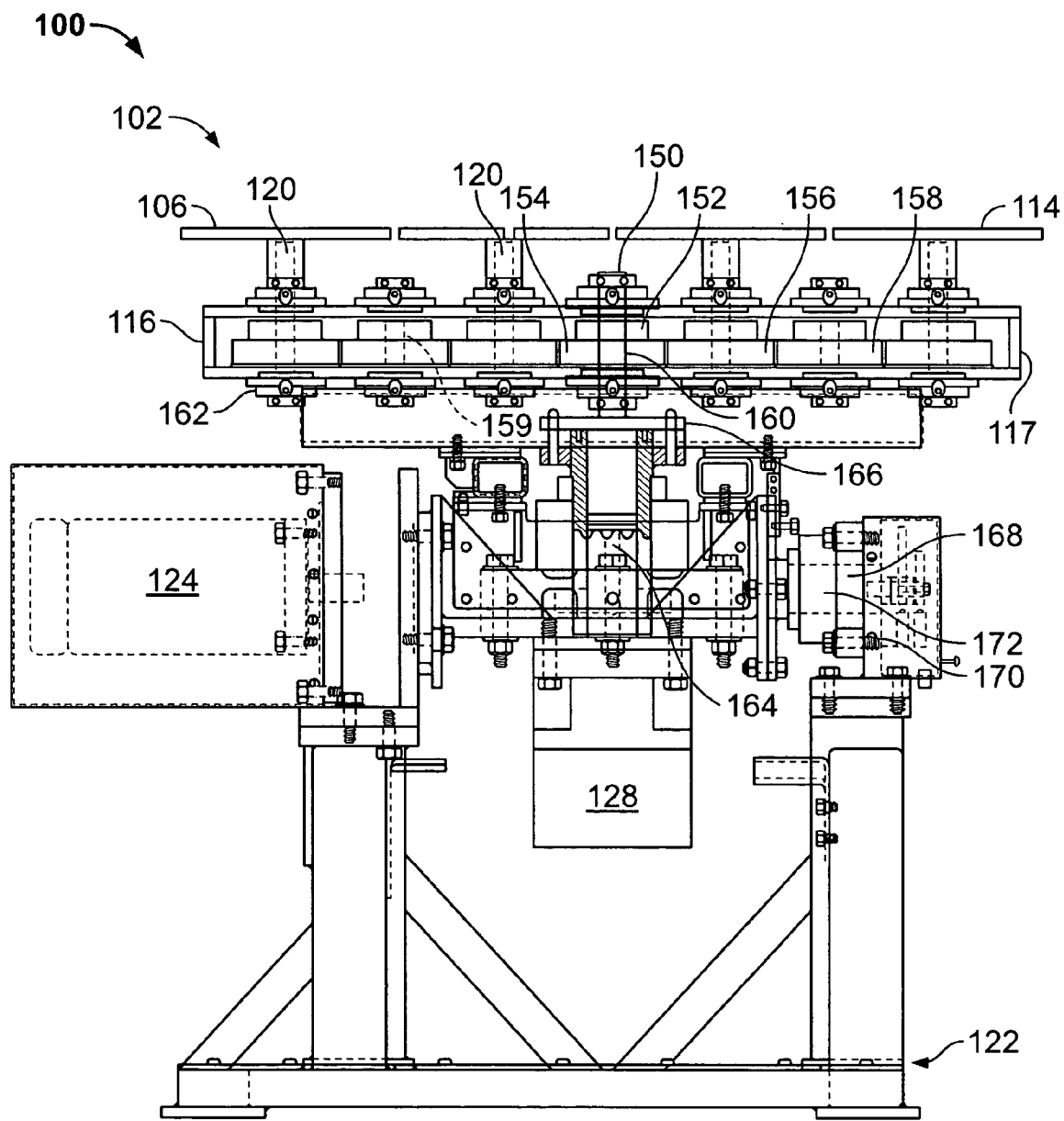
FIG. 2 is a schematic of an end view of an exemplary component manufacturing apparatus used with the spray coating system shown in FIG. 1.

FIG. 2 is a schematic of an end view of a component manufacturing apparatus 102 used with coating system 100. In addition to spindles 120, assembly 102 also includes a plurality of upper bearings 150, a plurality of collars 152, a main drive gear 154, a plurality of platen drive gears 156, a plurality of inter-platen drive gears 158, a plurality of inter-platen drive gear shafts 159, a main drive gear drive shaft 160, a plurality of lower bearings 162, a platen drive shaft 164, a drive assembly-to-positioning assembly coupling 166, a tilt drive shaft 168, a tilt drive shaft bearing 170 and a tilt axis of rotation 172. Bearing 170 supports tilt drive shaft 168. A platen drive shaft-to-main drive gear drive shaft coupling (not shown in FIG. 2) rotatably coupled to drive shaft 164 to drive shaft 160.

In the exemplary embodiment four fixtures 110 (shown in FIG. 1) are securely coupled each respective platen 114 to enable up to four turbine blades 112 (shown in FIG. 1) to be coupled to apparatus 102. Platen drive electric motor 126 is coupled to platen drive shaft 164 via translational gear 128. Gear 128 receives input from motor 126 and causes drive shaft 164 to rotate in a plane of rotation that is orthogonal to tilt axis of rotation 172. More specifically, in the exemplary embodiment, the rotation may be in a clockwise or counter-clockwise direction, or the motor 126 may cause oscillation between the two rotational directions.

Drive shaft 164 is rotatably coupled to main drive gear drive shaft 160 via platen drive shaft-to-main drive gear drive shaft coupling (not shown in FIG. 2) and rotation is induced to drive shaft 160 from drive shaft 164. Drive shaft 160 subsequently rotates main drive gear 154 which causes rotation of two adjacent platen drive gears 156. Gears 156 transmit rotation to inter-plated drive gears 158 located adjacent to gears 156. Gears 158 transmit rotation to a second pair of platen drive gears 156 adjacent to gears 158. Upper bearings 150, collars 152, lower bearings 162, and inter-platen drive shafts 159 provide axial and radial support for gears 160, 158, and 156.

Rotation transmitted to platens 114 subsequently oscillates fixtures 110 and blades 112 such that an orientation of blades 112 is selectively changed in unison with respect to spray nozzle 105. More specifically, in the exemplary embodiment, the rotation transmitted to platens 114 is substantially uniform such that the orientation of blades 112 with respect to spray nozzle 105 is changed in a substantially constant manner that facilitates a consistent deposition of a coating being applied to each of all blades 112.

Moreover, during operation, positioning assembly 108 also provides tilt rotation along tilt axis 172. More specifically, tilt drive electric motor 124 induces rotation to tilt drive shaft 168 because shaft 168 is coupled to positioning assembly 108, tilt rotation is transmitted to positioning assembly 108. In the exemplary embodiment, positioning assembly 108 is coupled to fixture assembly 106 and as tilt rotation is transmitted to positioning assembly 108, assembly 106 tilts simultaneously with assembly 108 to selectively change the orientation of blades 112 with respect to spray nozzle 105. Selective tilt rotation of blades 112 facilitates a consistent deposition of a coating being applied to blade 112.

Spray nozzle 105 is selectively moveable in a direction that is substantially parallel to, and radially toward and away from, component manufacturing apparatus 102. The movement of spray nozzle 105, and the oscillation and tilting of blades 112 are selectively controlled via a positioning and coating control sub-system (not shown in FIG. 2) that includes a plurality of inputs, a plurality of outputs, a plurality of algorithms, a plurality of operator interfaces, and at least one processor to facilitate a desired deposition of coating being concurrently applied to blades 112.

Figure 3:
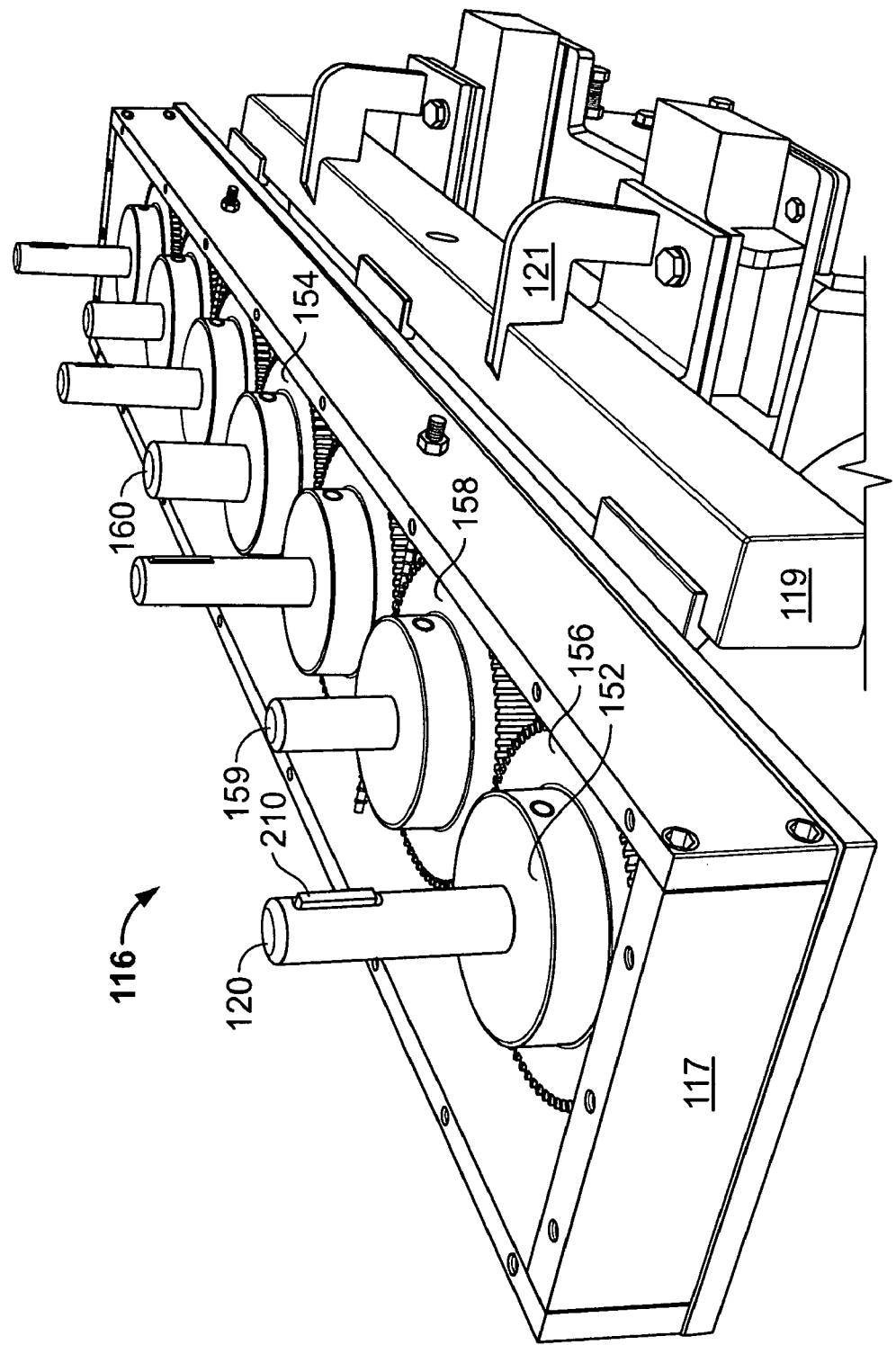
FIG. 3 is a perspective view of a portion of a partially assembled drive assembly used with the spray coating system shown in FIG. 1.
Figure 4:
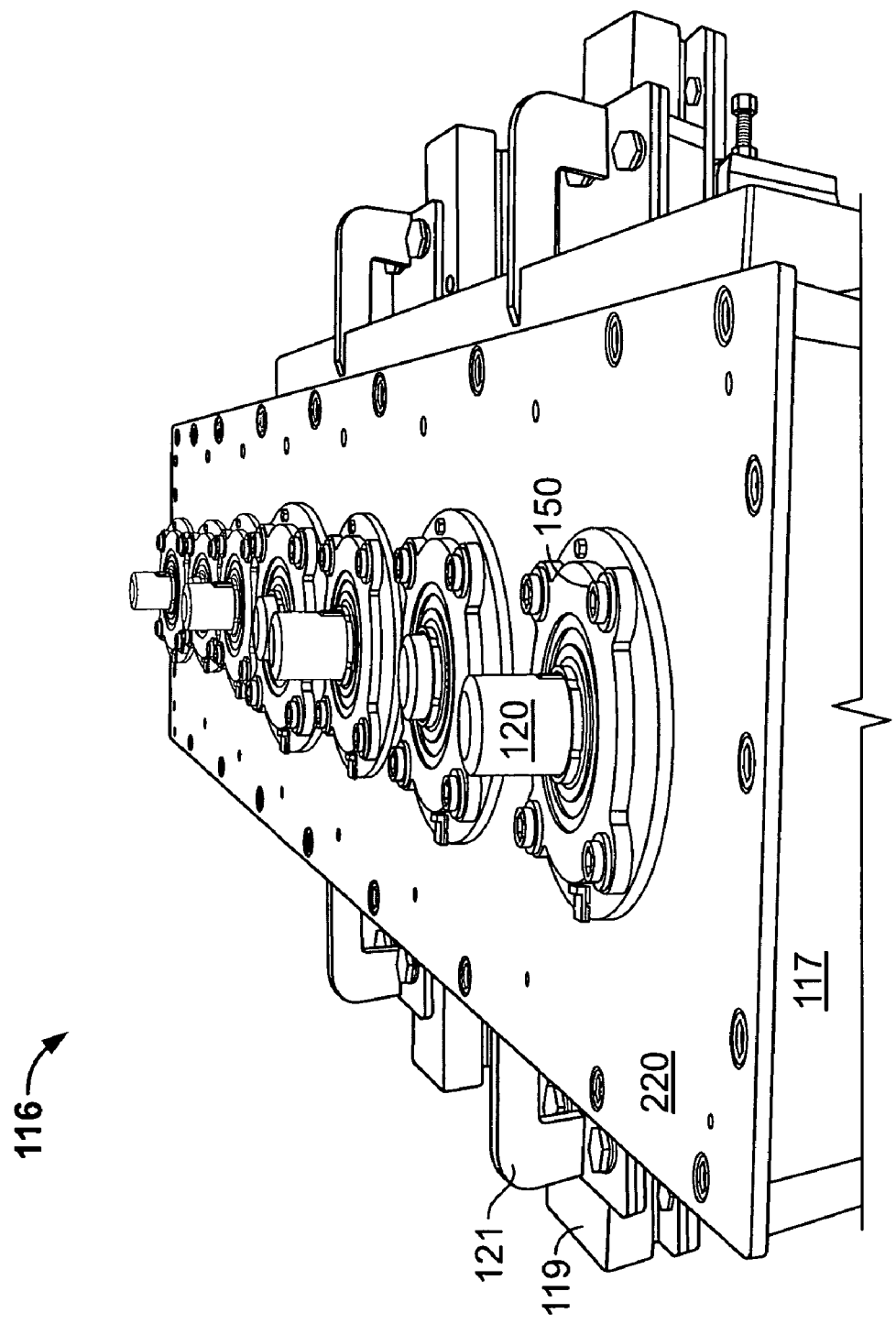
FIG. 4 is an end perspective view of the drive assembly shown in FIG. 3 and in an intermittent stage of assembly.

FIG. 3 is a perspective view of a portion of a partially assembled drive assembly 116 used with coating system 100 (shown in FIG. 1). FIG. 4 is an end perspective view of drive assembly 116 in an intermittent stage of assembly. During assembly of drive assembly 116, main drive gear 154 is coupled to main drive gear drive shaft 160 and is supported by lower bearing 162 (not shown in FIG. 3). Collar 152 is coupled to main drive gear drive shaft 160 and supported by main drive gear 154. Two platen drive gears 156 are coupled around spindles 120 and supported by lower bearing 162 (not shown in FIG. 3) on opposite sides of main drive gear 154. Collars 152 are inserted over spindles 120 and are positioned in contact with platen drive gears 156. Two inter-platen drive gears 158 are coupled around inter-platen drive gear shafts 159 and supported by lower bearings 162 (not shown in FIG. 3) such that collars 152 are in contact with inter-platen drive gears 158 on opposite sides of platen drive gears 156. Two platen drive gears 156 are coupled to spindles 120 and supported by lower bearing 162 (not shown in FIG. 3) on opposite sides of inter-platen drive gears 158. A biased spindle-to-platen coupling 210 is coupled to each spindle 120. Platens 114 (not shown in FIG. 3) are inserted over spindles 120 and spring-loaded, biased couplings 210 securely engage platens 114 through direct contact of coupling 210 to platen 114 inner wall. Top section 220 is then coupled to assembly 116.

Figure 5:
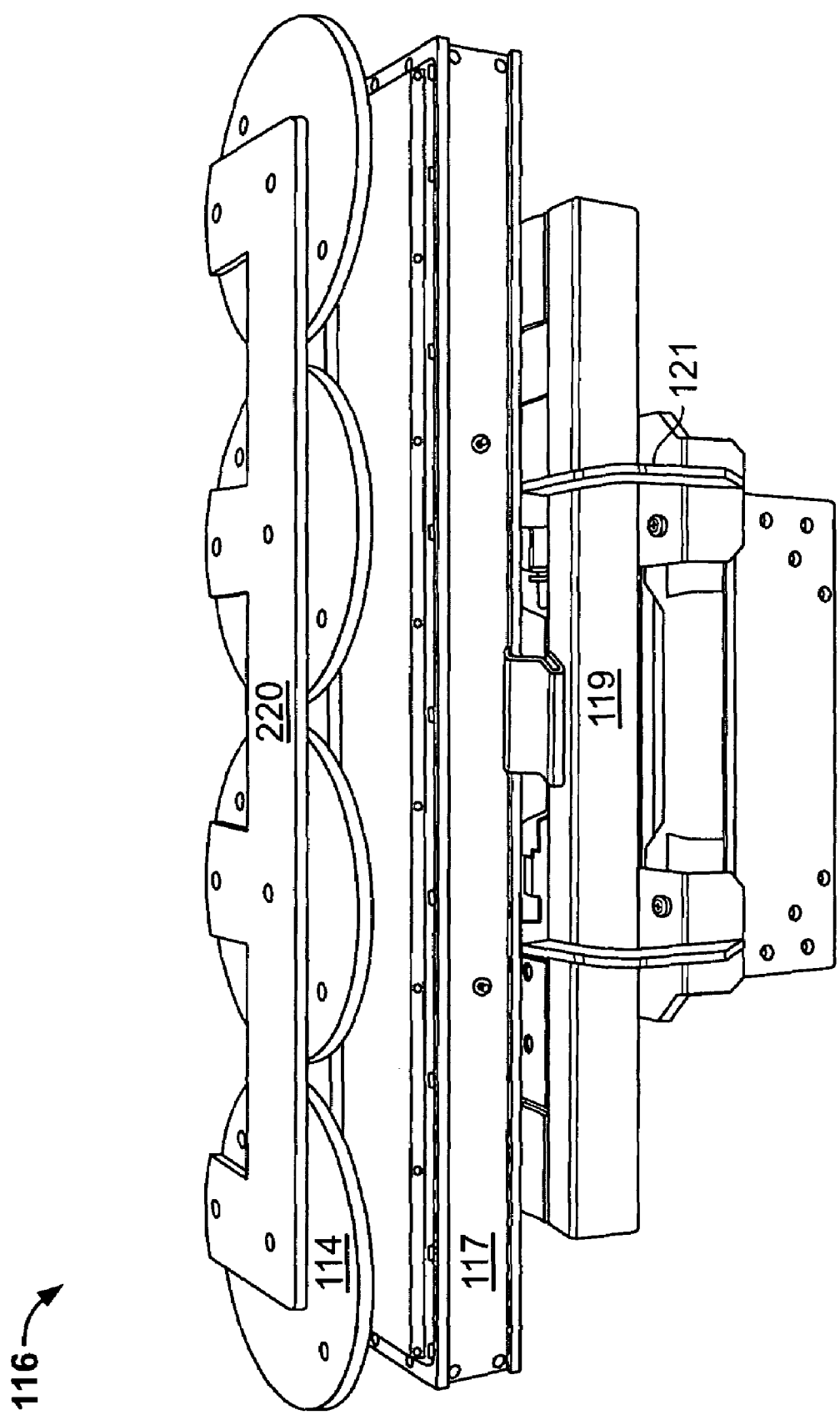
FIG. 5 is a side view of the drive assembly shown in FIG. 3 and in a final stage of assembly.

FIG. 5 is a side view of drive assembly 116 in a final stage of assembly with a platen brace 230 installed. Brace 230 facilitates maintaining platens 114 in a relatively stationary position during transport to and installation of assembly 116 to positioning assembly 108. During installation of drive assembly 116, straps (not shown in FIG. 5) are inserted through lifting slots 121 on both sides of assembly 116. A chain (not shown in FIG. 5) may be inserted through at least one strap loop (not shown in FIG. 5) and may be coupled to a hoisting mechanism (not shown in FIG. 5), to enable assembly 116 to be transported to, and coupled to, positioning assembly 108 (not shown in FIG. 5).

Figure 6:
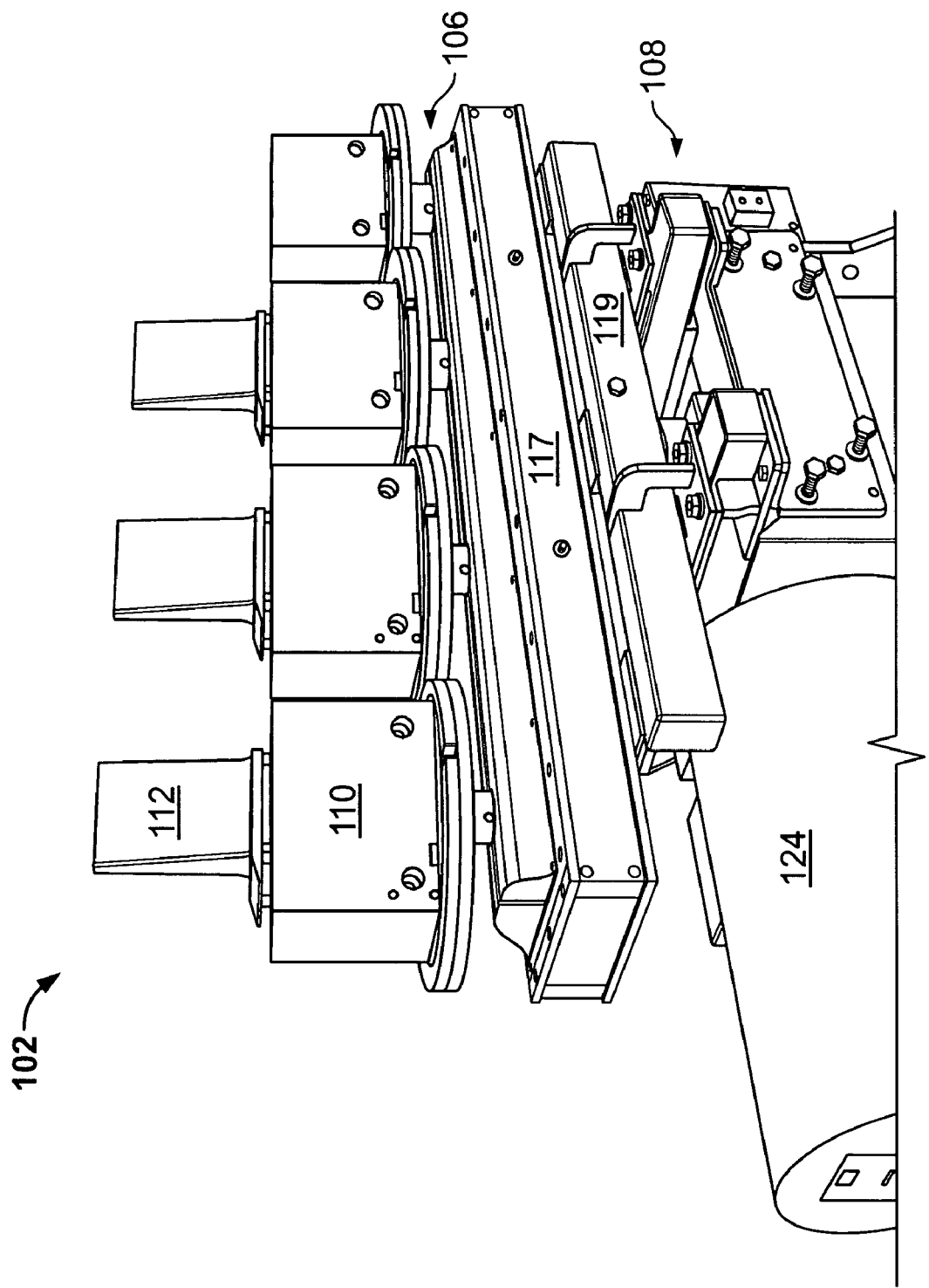
FIG. 6 is an enlarged perspective view of the component manufacturing apparatus assembly shown in FIG. 1.

FIG. 6 is an enlarged perspective view of component manufacturing apparatus 102. Drive assembly 116 is coupled to positioning assembly 108. Multiple turbine blades 112 are coupled to multiple fixtures 110 to illustrate the ability to coat a plurality of blades 112 in a single coating cycle.

In an alternate embodiment of fixture assembly 106, a single fixture spool may be coupled to base assembly 108 in place of drive assembly 116 to facilitate coating a single blade 112. Platen 114 is coupled to the spool, fixture 110 is coupled to platen 114 and blade 112 is coupled to fixture 110. Tilt and rotation is substantially similar to that described above with the exception being that the length of time of the coating cycle and the movement of spray nozzle 105 may be reduced to account for the smaller number of blades 112.

The component manufacturing assembly described herein facilitates manufacturing of a component. More specifically, the component manufacturing assembly will position turbine components to facilitate application of coatings. As a result, the time and expense of manufacturing turbine components can be reduced.

Although the methods and systems described and/or illustrated herein are described and/or illustrated with respect to manufacturing components, and more specifically, turbine blades, practice of the methods and systems described and/or illustrated herein is not limited to turbine blades nor to turbines generally. Rather, the methods and systems described and/or illustrated herein are applicable to manufacturing any component on any machine.

Exemplary embodiments of manufacturing components are described above in detail. The methods, apparatus and systems are not limited to the specific embodiments described herein nor to the specific components manufactured, but rather, may be utilized independently and separately from other methods, apparatus and systems described herein or to manufacture components not described herein. For example, other components can also be manufactured using the methods described herein.

While the invention has been described in terms of various specific embodiments, those skilled in the art will recognize that the invention can be practiced with modification within the spirit and scope of the claims.

What is claimed is:

1. A fixture assembly for use in manufacturing a plurality of components, said fixture assembly comprising:
    at least two fixtures configured to support the plurality of components being manufactured, each of said at least two fixtures having a first axis of rotation, said at least two fixtures oriented such that said first axes of rotation are substantially parallel; and
    a drive assembly comprising a plurality of spindles extending outward therefrom and a plurality of platens coupled to said spindles, each of said at least two fixtures coupled to each of said plurality of platens, said drive assembly configured to oscillate each of said at least two fixtures about each of said first axes of rotation, said fixture assembly is rotatable about a second axis of rotation that is orthogonal to said first axes of rotation.

2. A fixture assembly in accordance with claim 1 wherein said at least one fixture comprises a fastening mechanism configured to secure each of the plurality of components to a respective one of said plurality of fixtures such that the plurality of components are secured in position with respect to said drive assembly.

3. A fixture assembly in accordance with claim 1 wherein said drive assembly further comprises a plurality of drive gears configured to simultaneously position each of said at least two fixtures.

4. A fixture assembly in accordance with claim 1 wherein said plurality of platens arc each securely coupled to said plurality of spindles via a plurality of biased couplings, said plurality of platens are configured to support the plurality of components thereon.

5. A fixture assembly in accordance with claim 1 wherein said plurality of platens are spaced apart at pre-determined distances such that a component coupled to a first of said plurality of platens is rotatable relative to said drive assembly without contacting a fixture coupled to an immediately adjacent of said plurality of platens.

6. A fixture assembly in accordance with claim 1 wherein said drive assembly comprises a centerline axis of symmetry, said plurality of spindles are aligned substantially concentrically with respect to said drive assembly axis of symmetry.

7. A fixture assembly in accordance with claim 1 wherein said drive assembly further comprises a mounting frame comprising an enclosure housing, a plurality of bearings, and a plurality of drive gears, each of said plurality of bearings and said plurality of drive gears coupled to said plurality of fixtures.

8. A component manufacturing system comprising:
    a drive assembly;
    a fixture assembly comprising at least two fixtures coupled to said drive assembly, each of said at least two fixtures having a first axis of rotation, said at least two fixtures are oriented such that said first axes of rotation are substantially parallel; and
    a positioning assembly coupled to said fixture assembly, said drive assembly comprises a plurality of spindles extending outward therefrom and a plurality of platens coupled to said spindles, each of said at least two fixtures coupled to each of said plurality of platens, said drive assembly configured to oscillate each of said at least two fixtures about said first axes of rotation, said positioning assembly configured to rotate said fixture assembly about a second axis of rotation that is orthogonal to said first axes of rotation.

9. A component manufacturing system in accordance with claim 8 wherein said positioning assembly is configured to align said fixture assembly relative to a spray nozzle.

10. A component manufacturing system in accordance with claim 8 wherein said positioning assembly comprises at least one tilt drive mechanism coupled to said fixture assembly for positioning said fixture assembly, said positioning assembly coupled to a control mechanism.

11. A component manufacturing system in accordance with claim 10 wherein said at least one tilt drive mechanism comprises at least one tilt drive motor coupled to said fixture assembly to selectively control orientation of said fixture assembly.

12. A component manufacturing system in accordance with claim 8 wherein said plurality of platens are spaced apart at pre-determined distances such that a component coupled to a first of said plurality of platens is rotatable relative to said drive assembly without contacting a fixture coupled to an immediately adjacent of said plurality of platens.

13. A component manufacturing system in accordance with claim 8 wherein said positioning assembly comprises at least one drive motor wherein said at least one drive motor is coupled to said fixture assembly to selectively oscillate said at least two fixtures.

14. A component manufacturing system in accordance with claim 13 wherein said at least one drive motor is at least one of pneumatically, hydraulically, and electrically powered.

15. A component manufacturing system in accordance with claim 8 wherein said plurality of platens are each securely coupled to said plurality of spindles via a plurality of biased couplings, said plurality of platens are configured to support the plurality of components thereon.

* * * * *

UNITED STATES PATENT AND TRADEMARK OFFICE
CERTIFICATE OF CORRECTION

PATENT NO. : 7,597,762 B2  Page 1 of 1
APPLICATION NO. : 11/231499
DATED : October 6, 2009
INVENTOR(S) : Albanese et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1050 days.

Signed and Sealed this

Twenty-eighth Day of September, 2010

David J. Kappos
*Director of the United States Patent and Trademark Office*